United States Patent [19]

Abbott

[11] 4,029,139

[45] June 14, 1977

[54] TIRE AND RIM ASSEMBLY

[75] Inventor: John R. Abbott, Cuyahoga Falls, Ohio

[73] Assignee: The Goodyear Tire & Rubber Company, Akron, Ohio

[22] Filed: Jan. 5, 1976

[21] Appl. No.: 646,715

[52] U.S. Cl. .................... 152/379.1; 152/354; 152/362 R; 152/378 R; 152/381.1
[51] Int. Cl.² ..................................... B60C 15/02
[58] Field of Search ..... 152/379 R, 362 R, 362 CS, 152/381 R, 381 A, 354, 378, 393

[56] References Cited

UNITED STATES PATENTS

| | | | |
|---|---|---|---|
| 2,731,064 | 1/1956 | Powers | 152/381 R |
| 2,817,381 | 12/1957 | Powers | 152/381 R |
| 3,661,425 | 5/1972 | Verdier | 152/381 R |
| 3,910,336 | 10/1975 | Boileau | 152/379 R |

*Primary Examiner*—Drayton E. Hoffman
*Attorney, Agent, or Firm*—F. W. Brunner; R. P. Yaist

[57] ABSTRACT

A radial ply tire and rim assembly in which the rim has an axially extended flange with a special configuration to provide a double register for the bead area. The tire when mounted on the rim and inflated has its carcass distorted radially outwardly from the natural equilibrium curvature in which it was molded and the carcass curves axially inwardly to meet the bead core at a very small angle with respect to the axis of the tire.

11 Claims, 3 Drawing Figures

TIRE AND RIM ASSEMBLY

The foregoing abstract is not to be taken as limiting the invention of this application, and in order to understand the full nature and extent of the technical disclosure of this application, reference must be made to the accompanying drawing and the following detailed description.

This invention relates to pneumatic tires and more particularly to a radial ply tire and rim assembly.

It is known that while it is desirable to improve ride, durability and handling in pneumatic tires, usually an improvement in one of these qualities is accompanied by a partial degradation of one or more of the others. For example, the lateral stability and handling properties of a radial ply tire can be improved by providing stiffening members in the bead area and sidewalls adjacent the bead areas. This procedure, however, tends to cause a reduction in the riding quality of the tire.

It has also been suggested, for example, in U.S. Pat. No. 3,910,336 that the natural equilibrium curvature of the carcass structure be maintained from at least the mid-height of the sidewall until the carcass becomes tangent to the bead. This principle is also presented in *Mathematics Underlying the Design of Pneumatic Tires* by John F. Purdy, Hiney Printing Company. Particularly, see pages 130 to 137.

According to the present invention, however, a low profile radial ply tire is mounted on a special rim having a narrow bead spacing and a stabilizer flange extending axially outwardly from each bead register. The rim is designed to distort the carcass from its natural equilibrium curvature without causing any reversal of curvature in the carcass structure. A second register is provided at the axially outer edge of each stabilizer flange to engage the lower sidewall or bead area. The carcass ply, as it approaches each bead core curves axially inwardly to form a very small angle with respect to a line parallel to the rotational axis of the tire.

The preload of the carcass structure on specially designed stabilizer flanges along with the second register provide quicker response and better lateral stability without the provision of additional reinforcing members in the lower sidewall and bead area. The lack of extra components in this lower sidewall area tends to reduce the possibility of failure of the various components in this area and the entire sidewall is free to flex in the radial direction to provide good riding qualities.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 1:
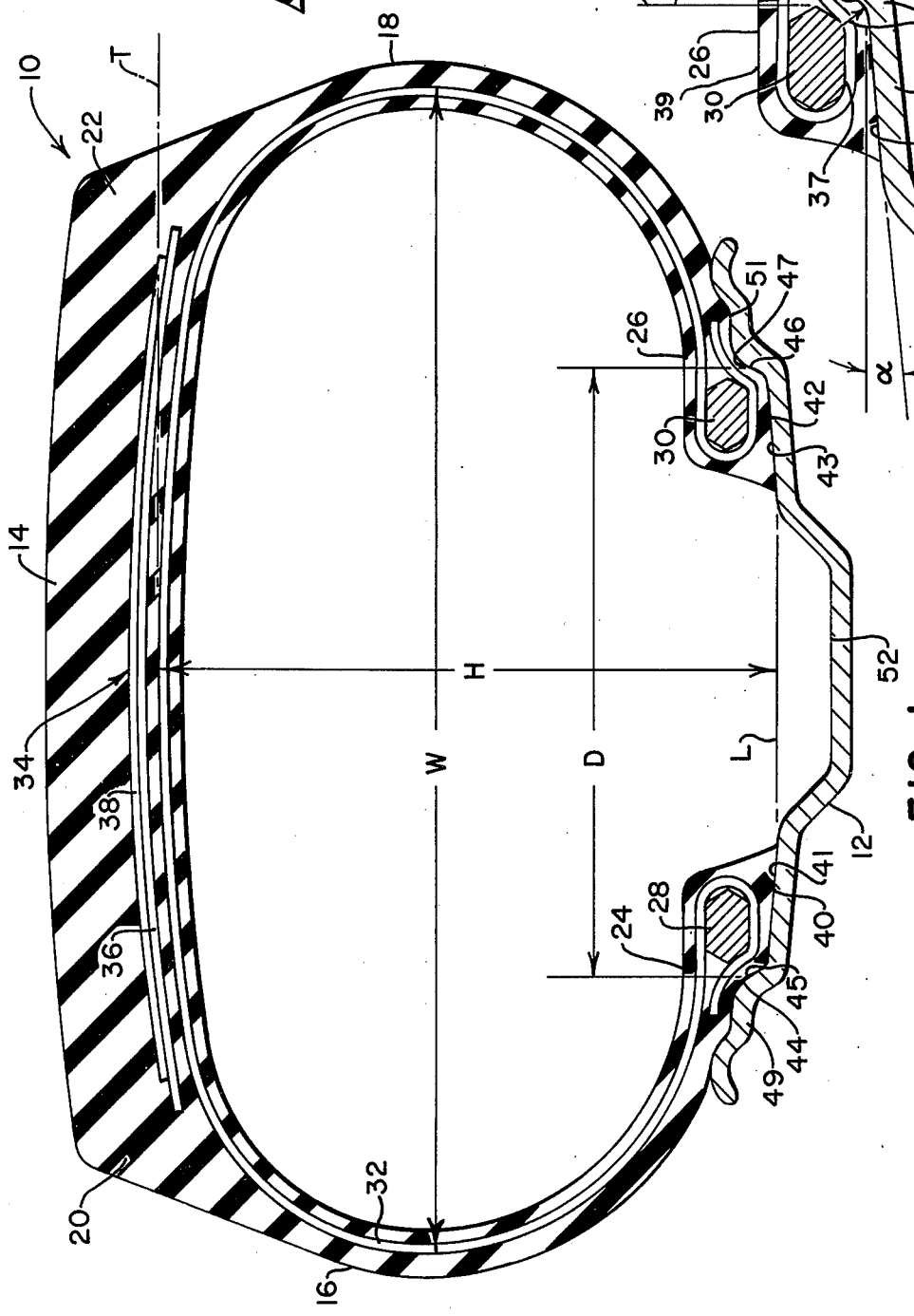
FIG. 1 is a cross-sectional view of a tire and rim assembly made in accordance with the present invention.

With reference to the drawings and in particular FIG. 1, there is illustrated a tire 10 mounted on a rim 12 and inflated to design inflation pressure. For purposes of this invention, design inflation pressure shall be considered the average of the maximum and minimum design inflation pressures.

The tire 10 includes a circumferentially extending tread portion 14 and a pair of sidewall portions 16, 18 extending radially inwardly from the tread portion 14. The sidewall portions 16 and 18 curve axially inwardly toward each other at their radially inner ends and terminate in a pair of bead portions 24, 26. Each bead portion 24, 26 includes a circumferentially extending inextensible bead core 28, 30. A carcass structure 32 having its cords lying in planes containing the rotational axis of the tire extends circumferentially about the tire 10 and from bead core 28 to bead core 30.

For purposes of this invention, the dimensions and proportions of the tire are determined when the tire is inflated to design inflation pressure and in a static, unloaded condition as illustrated in FIG. 1. The section height H of the tire 10 is the radial distance from the bead base line L to a tangent T to the radially outermost extremity of the carcass structure 32. The section width W is the axial distance between the axially outermost extremities of the carcass structure 32. A tire 10 made in accordance with the present invention has an aspect ratio (H/W) which is no greater than 0.75 or 75 percent and preferably from about 40 to about 60 percent.

Although one carcass ply is illustrated, any suitable number of carcass plies could be utilized. Further, for purposes of this invention, a radial ply tire shall be constructed to include pneumatic tires in which all of the cords in the sidewall extend at angles no greater than 15° with respect to planes containing the rotational axis of the tire over a radial extent of the sidewall equal to at least 50 percent of the section height H of the tire.

The tire 10 also includes a circumferentially extending belt structure 34 disposed radially outwardly of the carcass structure 32 and extending in axial directions substantially from the shoulder portion 20 to the shoulder portion 22. Although, in the particular embodiment illustrated, two belt plies 36 and 38 are illustrated, it will be appreciated that any number of belt plies suitable for the specific application may be utilized. The cords in the belt plies may extend parallel to the circumferential centerline of the tire or they may extend at any suitable bias angle with respect to the circumferential centerline. Further, it will be appreciated that any material suitable for the particular application may be utilized for the carcass structure 32 and the belt structure 34, such as, by way of example only, nylon, rayon, polyester, fiberglass, steel, or aramid. Also, it is possible to provide the tire 10 with a replaceable tread or a replaceable track belt instead of the integral tread structure illustrated. The drop center well 52 could be eliminated and the tire could be mounted on a split rim or a rim of the type having a demountable flange. Both rim constructions are well known in the art and not considered a part of the present invention and will, therefore, not be discussed in further detail herein.

The rim 12 includes a pair of conical or tapered bead seats 40 and 42 having a bead seat surface 41 and 43, respectively. A first pair of bead registers 44 and 46 each having a bead register surface 45 and 47, respectively, extend radially outwardly from the respective axially outer edges of the bead seats 40 and 42. A pair of annular stabilizer flanges 49 and 51, respectively, extend axially outwardly of and from the radially outer extremities of the respective bead registers 44 and 46.

The rim 12 includes a drop center well 52 to facilitate mounting the tire 10 on the rim 12. The axial distance D between the first pair of bead registers 45 and 47 is no greater than 65 percent of the section width W of the carcass structure 32.

Figure 2:
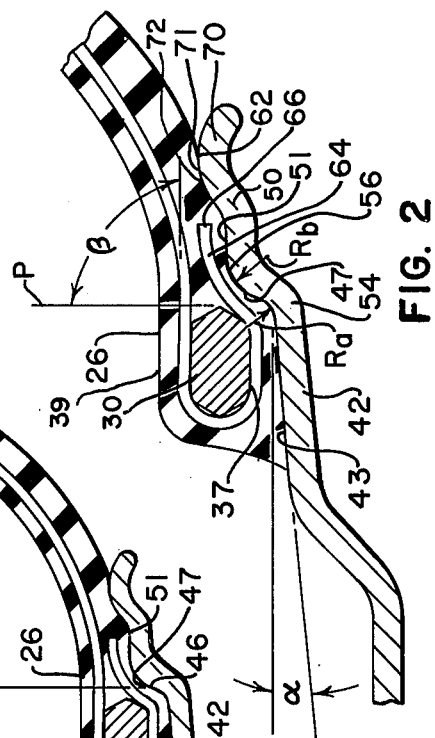
FIG. 2 is an enlarged view of the flange and bead area of the assembly of FIG. 1.

More particularly and with reference to FIG. 2, there is illustrated an enlarged view of the bead portion 26 of the tire 10 of FIG. 1. Only one bead portion 26 will be described herein, it being understood that both bead portions 24 and 26 are similar. For purposes of clarity, the same numerals used in FIG. 1 will be used for corresponding parts in FIG. 2. The bead seat 42 as noted above is generally conical and may have its bead seat surface 43 extending at an angle alpha ($\alpha$) with respect to the rotational axis of the tire of up to about 15 degrees. The bead seat surface 43 merges with the bead register surface 47 through a curved portion 54. The bead register surface 47 merges with the flange surface 51 through another curved portion 56. For purposes of this invention the bead register surface 47 shall extend between the radius $R_a$ of the curved portion 54 to the radius $R_b$ of the curved portion 56 with both the radius $R_a$ and the radius $R_b$ extending at an angle of 45 degrees with respect to the rotational axis of the tire 10.

The bead register surface 47 does not extend in radial directions any farther than the radially outer surface 39 of the bead core 26.

The carcass structure 32 is wrapped around the bead core 26 and has its end portion 64 lying adjacent the main portion of the carcass structure 32. The turned-up portion 64 terminates at a point 66 which is axially inwardly of the initial contact point 62 in the sidewall. Further, as seen in FIG. 2, the carcass structure 32 approaches the bead core 26 at a very large angle $\beta$ with respect to the plane P that is tangent to the axially outer surface of the bead core 26. This angle $\beta$ is substantially greater than 60 degrees but no more than 90°. Preferably $\beta$ should be at least 80 degrees.

More particularly, in accordance with the present invention, the stabilizer flange 50 has its flange engaging surface 51 extending parallel to the carcass structure 32 and has an additional annular register 70 located at its axially outer edge. The second or additional bead register has a tire engaging surface 71 which curves toward the carcass structure 32 in a smooth arc to provide an indentation 72 in the rubber between the carcass structure 32 and the second register 70.

Figure 3:
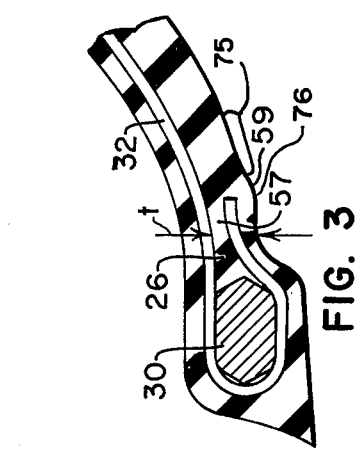
FIG. 3 is an enlarged view of the bead area of the tire of FIG. 1 as it appears off the rim.

With reference to FIG. 3, in order to provide the desired compression between the combined stabilizer flange 51 and second register 70 and the bead portion 26, the bead portion 26 is provided with a unique molded contour such that when the tire 10 is mounted on the rim 12 and inflated, the bead portion is compressed against the stabilizer flange 50. Conversely, the stabilizer flange 51 distorts the carcass structure 32 radially outwardly and the second register 70 compresses the rubber to provide a second gripping area in stability. A special configuration of the elastomeric material 57 between the carcass structure 32 and the outer surface 59 of the bead portion 26 is provided. This elastomeric material 57 shall be construed to include all chaffers, chippers, turn-up plies, etc. which may be disposed between the contact surface 59 and the carcass structure 32. The thickness $t$ of the tire measured between the carcass structure 32 and the contact surface 59 is substantially constant, throughout the area generally indicated at 75 which is destined to be in contact with the second register 70. The thickness $t$ thereafter decreases slightly as it approaches the bead core 30 to provide a generally cylindrical surface 76 for engagement with the stabilizer flange 51.

When the tire 10 is mounted on the rim 12 and inflated, the bead portion 26 rests neatly against the first register surface 47 and the stabilizer flange 51 and the rest of the surface 59 is compressed toward the carcass structure 32 by the second register 70. This provides for a minimum thickness t at the axial center of each second register surface and a larger thickness $t$ at the axially outer edges of each second register surface.

The tire according to the present invention may be built in a normal fashion by assembling the various components on a tire building form. The tire can then be shaped and cured in a mold under heat and pressure.

The neutral contour line of a carcass ply is the center line of a wire or cord in the carcass ply as viewed in planes containing the rotational axis of the tire. If more than one carcass ply is present the neutral contour line shall be the center line of the composite of the carcass plies as viewed in planes containing the rotational axis of the tire.

The tire 10 is maintained during vulcanization in a configuration in which the neutral contour line of the carcass structure 32 follows the natural equilibrium curvature at least from the plane P tangent to the axially outer edges of the respective bead core substantially to the respective shoulder portion of the tire. The natural equilibrium curvature of tires is well known and defined in the art and thus will not be discussed in detail herein. See for example, Chapter II, *Mathematics Underlying the Design of Pneumatic Tires*, by John F. Purdy, and *Theory for the Meridian Section of Inflated Cord Tire*, by R. B. Day and S. D. Gehman, Rubber Chemistry and Technology, Volume XXXVI, No. 1, P; 11–27, January - March 1963, both of which are incorporated herein by reference.

The tire after curing is mounted on a specifically designed rim which causes the neutral contour line of the carcass structure 32 to deviate from the natural equilibrium curvature and thus provide a preloading on the axially extending flanges. The flanges, therefore, force the neutral contour line of the carcass structure radially outwardly from the natural equilibrium curvature at least from a point just axially outwardly of the plane P at least to the point of maximum axial width of the tire without causing any reversal of curvature.

While certain representative embodiments and details have been shown for the purpose of illustrating the invention, it will be apparent to those skilled in the art that various changes and modifications may be made therein without departing from the spirit or scope of the invention.

What is claimed is:
1. In a radial ply pneumatic tire and rim assembly;
  a. a rim including a pair of spaced annular bead seat surfaces, a first annular register surface extending generally radially outwardly from the axially outer edge of each bead seat surface, and an annular stabilizer flange surface extending generally axially outwardly from the radially outer edge of each said first annular register surface;
  b. a pneumatic tire of the open-bellied type having a tread portion, a pair of sidewall portions, a pair of axially spaced apart bead portions each having an annular inextensible bead core, a carcass structure of inextensible cords extending continuously from one bead core to the other bead core and having a neutral contour line, and a circumferentially extending belt structure disposed circumferentially about said carcass ply; and c. a second annular register surface extending from the axially outer edge of said stabilizer flange surface and having an arcuate configuration such that the spacing between said carcass structure and the rim is substantially constant in the area of the stabilizer flange surface and is less in the area of the second bead register surface than in the area of the stabilizer flange surface.

2. An assembly as claimed in claim 1 wherein the spacing between said second register surface is a minimum at the axial center of said second register surface and greatest at the axial outer edges thereof.

3. An assembly as claimed in claim 1 wherein the tire, when off the rim, has a substantially constant thickness of the elastomeric material between the surface of the tire and the carcass from the axially outer edge of the stabilizer flange surface through the second register surface and the decreased spacing between the second register surface and the carcass structure is caused by compression of said elastomeric material between the second register surface and said carcass structure when the tire is mounted on a rim and inflated.

4. An assembly as claimed in claim 2 wherein the tire, when off the rim, has a substantially constant thickness of the elastomeric material between the surface of the tire and the carcass from the axially outer edge of the stabilizer flange surface through the second register surface and the decreased spacing between the second register surface and the carcass structure is caused by compression of said elastomeric material between the second register surface and said carcass structure when the tire is mounted on a rim and inflated.

5. An assembly as claimed in claim 1 wherein the angle of said carcass structure with respect to a plane tangent to the axially outer surface of each bead core at each bead core is at least 80°.

6. An assembly as claimed in claim 4 wherein the angle of said carcass structure with respect to a plane tangent to the axially surface of each bead core at each bead core is at leat 80°.

7. An assembly as claimed in claim 6 wherein the spacing between said first register surface is no greater than the 65 percent of the maximum axial width of the carcass structure when the tire is mounted on the rim and inflated.

8. An assembly as claimed in claim 7 wherein said first register surface extends in radial directions no farther than the radially outer extremity of the adjacent bead core.

9. A tire and rim assembly as claimed in claim 8 wherein the radially inner extremities of said carcass ply are turned axially outwardly about the respective bead cores and terminate within the axial extent of the contact area of said stabilizer flange.

10. An assembly as claimed in claim 6 wherein the neutral contour line is displaced radially outwardly from the natural equilibrium curve of the tire from a point adjacent the bead core at least to said point of maximum axial width by said stabilizer flange surface and said second register surface with no reversal of curvature.

11. An assembly as claimed in claim 9 wherein the neutral contour line is displaced radially outwardly from the natural equilibrium curve of the tire from a point adjacent the bead core at least to said point of maximum axial width by said stabilizer flange surface and said second register surface with no reversal of curvature.

* * * * *